US007228432B2

(12) United States Patent
Angelo et al.

(10) Patent No.: US 7,228,432 B2
(45) Date of Patent: Jun. 5, 2007

(54) METHOD AND APPARATUS FOR PROVIDING SECURITY FOR A COMPUTER SYSTEM

(76) Inventors: Michael F. Angelo, 3303 Amber Forest Dr., Houston, TX (US) 77068; E David Neufeld, 19900 Indigo Lake Dr., Magnolia, TX (US) 77355; David Heisey, 9611 E. Savile Cir., Houston, TX (US) 77065

( * ) Notice: Subject to any disclaimer, the term of this patent is extended or adjusted under 35 U.S.C. 154(b) by 685 days.

(21) Appl. No.: 10/660,335

(22) Filed: Sep. 11, 2003

(65) Prior Publication Data

US 2005/0060541 A1    Mar. 17, 2005

(51) Int. Cl.
*G06F 1/24* (2006.01)
(52) U.S. Cl. ............... 713/182; 713/164; 713/165; 713/166; 713/167
(58) Field of Classification Search ............... 713/182, 713/164, 165, 166, 167
See application file for complete search history.

(56) References Cited

U.S. PATENT DOCUMENTS

| 5,101,492 A | 3/1992 | Schultz et al. |
| 5,159,533 A | 10/1992 | Kuang |
| 5,175,670 A | 12/1992 | Wang |
| 5,224,019 A | 6/1993 | Wong et al. |
| 5,249,279 A | 9/1993 | Schmenk et al. |
| 5,271,152 A | 12/1993 | Murphy |
| 5,289,540 A * | 2/1994 | Jones ............... 713/165 |
| 5,331,646 A | 7/1994 | Neufeld |
| 5,333,305 A | 7/1994 | Neufeld |
| 5,363,273 A | 11/1994 | Ma |
| 5,408,644 A | 4/1995 | Schneider et al. |
| 5,440,716 A | 8/1995 | Schultz et al. |
| 5,490,342 A | 2/1996 | Rutterman |
| 5,522,065 A | 5/1996 | Neufeld |
| 5,555,416 A * | 9/1996 | Owens et al. ............... 717/178 |
| 5,592,648 A | 1/1997 | Schultz et al. |
| 5,668,971 A | 9/1997 | Neufeld |
| 5,737,744 A | 4/1998 | Callison et al. |
| 5,742,829 A * | 4/1998 | Davis et al. ............... 717/178 |
| 5,748,888 A | 5/1998 | Angelo et al. |
| 5,748,940 A | 5/1998 | Angelo et al. |
| 5,778,070 A | 7/1998 | Mattison |
| 5,822,184 A | 10/1998 | Rabinovitz |
| 5,844,986 A | 12/1998 | Davis |
| 5,848,418 A | 12/1998 | de Souza et al. |
| 5,850,559 A | 12/1998 | Angelo |
| 5,859,911 A | 1/1999 | Angelo et al. |
| 5,887,131 A | 3/1999 | Angelo |
| 5,892,906 A | 4/1999 | Chou et al. |

(Continued)

OTHER PUBLICATIONS

Angelo et al., "Method and Apparatus to Provide Enchanced Computer Protection," U.S. Appl. No. 09/540,697, filed Mar. 31, 2000.

(Continued)

*Primary Examiner*—Thomas R. Peeso

(57) ABSTRACT

A method and apparatus for providing security for a computer system, which includes generating a request for a file. The request is received at a dedicated security processor, where the dedicated security processor may access the file to validate the requested file. Upon determining that the requested file is valid, the dedicated security processor may provide the requested file to another processor.

30 Claims, 5 Drawing Sheets

U.S. PATENT DOCUMENTS

| | | | |
|---|---|---|---|
| 5,909,691 | A | 6/1999 | Schultz et al. |
| 5,923,754 | A | 7/1999 | Angelo et al. |
| 5,944,821 | A | 8/1999 | Angelo |
| 5,949,882 | A | 9/1999 | Angelo |
| 5,953,422 | A | 9/1999 | Angelo et al. |
| 5,955,722 | A | 9/1999 | Kurz et al. |
| 5,960,084 | A | 9/1999 | Angelo |
| 5,974,250 | A | 10/1999 | Angelo et al. |
| 5,974,438 | A | 10/1999 | Neufeld |
| 6,003,144 | A | 12/1999 | Olarig et al. |
| 6,009,524 | A | 12/1999 | Olarig et al. |
| 6,026,016 | A | 2/2000 | Gafken |
| 6,032,257 | A | 2/2000 | Olarig et al. |
| 6,057,965 | A | 5/2000 | Angelo et al. |
| 6,061,794 | A | 5/2000 | Angelo et al. |
| 6,085,299 | A | 7/2000 | Angelo et al. |
| 6,116,509 | A | 9/2000 | Angelo et al. |
| 6,118,589 | A | 9/2000 | Aneglo et al. |
| 6,119,228 | A | 9/2000 | Angelo et al. |
| 6,125,446 | A | 9/2000 | Olarig et al. |
| 6,131,174 | A | 10/2000 | Fischer et al. |
| 6,134,591 | A | 10/2000 | Nickles |
| 6,167,538 | A | 12/2000 | Neufeld et al. |
| 6,182,892 | B1 | 2/2001 | Angelo et al. |
| 6,199,167 | B1 | 3/2001 | Heinrich et al. |
| 6,263,431 | B1 | 7/2001 | Lovelace |
| 6,288,843 | B1 | 9/2001 | Angelo et al. |
| 6,298,411 | B1 | 10/2001 | Giacalone |
| 6,308,265 | B1 | 10/2001 | Miller |
| 6,311,273 | B1 | 10/2001 | Helbig, Sr. et al. |
| 6,330,674 | B1 | 12/2001 | Angelo et al. |
| 6,363,449 | B1 | 3/2002 | Side et al. |
| 6,370,649 | B1 | 4/2002 | Angelo et al. |
| 6,400,823 | B1 | 6/2002 | Angelo |
| 6,401,208 | B2 | 6/2002 | Davis et al. |
| 6,418,533 | B2 | 7/2002 | Angelo et al. |
| 6,442,631 | B1 | 8/2002 | Neufeld et al. |
| 6,460,121 | B1 | 10/2002 | Bonola |
| 6,463,495 | B1 | 10/2002 | Angelo et al. |
| 6,467,048 | B1 | 10/2002 | Olarig et al. |
| 6,470,443 | B1 | 10/2002 | Emer et al. |
| 6,477,648 | B1 | 11/2002 | Schell et al. |
| 6,502,203 | B2 | 12/2002 | Barron et al. |
| 6,505,268 | B1 | 1/2003 | Schultz et al. |
| 6,567,901 | B1 | 5/2003 | Neufeld |
| 6,581,162 | B1 | 6/2003 | Angelo |
| 6,609,204 | B1 | 8/2003 | Angelo |

OTHER PUBLICATIONS

Angelo et al., "Method and Apparatus for Providing Enhanced Computer Security," U.S. Appl. No. 09/540,812, filed Mar. 31, 2000.

Angelo et al., "Comupter System Having Security Features," U.S. Appl. No. 09/540,811, filed Mar. 31, 2000.

Neufeld, E. David, "Method and Apparatus for Preserving the Integrity of Management Subsystem Envrionment," U.S. Appl. No. 09/967,268, filed Sep. 28, 2001.

Neufeld, et al., "Method and Apparatus for Generating a Strong Random Number for Use in a Security Subsystem for a Processor-Based Device," U.S. Appl. No. 09/966,890, filed Sep. 28, 2001.

Brown et al., "Method and Apparatus for Preserving a Strong Random Number Across Battery Replacement in a Security Subsystem," U.S. Appl. No. 10/037,511, filed Jan. 4, 2002.

Franz et al., "Method and Apparatus for Initiating Strong Encryption Using Existing SSL Connection for Secure Key Exchange," U.S. Appl. No. 10/037,491, filed Jan. 4, 2002.

Reeves et al., "Virtual Media from a Directory Service," U.S. Appl. No. 10/038,239, filed Jan. 4, 2002.

Reeves et al., "Method and Apparatus for Increasing the Functionality and Ease of Use of Lights Out Management in a Directory Enabled Environment," U.S. Appl. No. 10/037,684, filed Jan. 4, 2002.

Franz et al., "Method and Apparatus for Identifying the Write Protect Status of a Diskette," U.S. Appl. No. 10/043,478, filed Jan. 10, 2002.

Angelo et al., "Method and Apparatus for Using a MAC Address as Unique Machine Parameters to Identify Equipment," U.S. Appl. No. 10/184,146, filed Jun. 28, 2002.

Angelo et al., "Compact Mounting of Chip Card Reader at Front of Computer Device Bay Area," U.S. Appl. No. 09/115,068.

Neufeld et al., "Method and Apparatus to Provide Secure Communications Between Systems," U.S. Appl. No. 10/632,500, filed Aug. 1, 2003.

* cited by examiner

METHOD AND APPARATUS FOR PROVIDING SECURITY FOR A COMPUTER SYSTEM

BACKGROUND OF THE INVENTION

This section is intended to introduce the reader to various aspects of art, which may be helpful in providing the reader with background information to facilitate a better understanding of the various aspects of the present techniques. Accordingly, it should be understood that these statements are to be read in this light, and not as admissions of prior art.

In the field of processor-based computer systems, it may be desirable for information to be transferred from a computer system to another computer system via a network. Computer networks may be arranged to allow information, such as files or programs, to be shared across an office or any geographic boundary. As an aspect of efficiently maintaining the exchange of information, computer systems in a network may include various security systems, such as programs or devices, to prevent unauthorized intrusions or attacks from outside sources. These security systems, for example, may prevent malicious or unknown code that corrupt data and programs stored on the computer system.

In providing security for a computer system, computer systems typically preclassify viruses to assist in identifying malicious code. However, when new viruses are introduced, computer systems are vulnerable because a virus may be unknown or unclassified. As a result, the computer system is not able to remove an unknown virus before it attacks the computer system. In addition, the performance of the central processing unit ("CPU") may be impacted by the operation of security functions of the computer system. The computer system's overall performance may be diminished because the security functions are consuming the resources of the CPU.

SUMMARY OF THE INVENTION

The present invention relates generally to a technique of providing security for a computer system. In the technique, a request may be generated for a file. The dedicated security processor receives the request for the file and accesses the requested file. Then, the dedicated security processor validates the requested file and provides the file to another processor, if the requested file is validated.

BRIEF DESCRIPTION OF THE DRAWINGS

Exemplary embodiments of the invention are apparent upon reading the following detailed description with reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The disclosed embodiments provide an improved approach that may address one or more of the issues discussed above, while enhancing the performance of a computer system. With computer systems, security functions may be provided to protect the system. The security functions may be managed by a device or component, such as a processor, that is within the computer system or external to the computer system. In the disclosed embodiments, the security of the computer system is maintained in a manner that: (1) protects against defeat by thread models or technologies; (2) minimizes interaction with the CPU; and (3) allows trapping of code that is unknown or unclassified.

For instance, while not limited in any way to such applications, the disclosed embodiments may enable a computer system to operate in a more efficient manner by having a security co-processor that protects against defeat by thread models or technologies. Threaded programs allow background and foreground action to take place without the overhead of launching multiple processes or inter-process communication. By having a security co-processor examine code and activities that are independent of the operating system, the threaded programs are unable to defeat the security of the computer system. In addition, the security co-processor may minimize the performance impact on the central processing unit ("CPU") of a computer system by performing the security functions, which allows the CPU to devote more resources to non-security related functions. Furthermore, the security co-processor may examine new code without the code being pre-classified. Thus, as new viruses are introduced, the security co-processor may trap the unknown or unclassified code before the CPU is damaged by an attack from the code.

Figure 1:
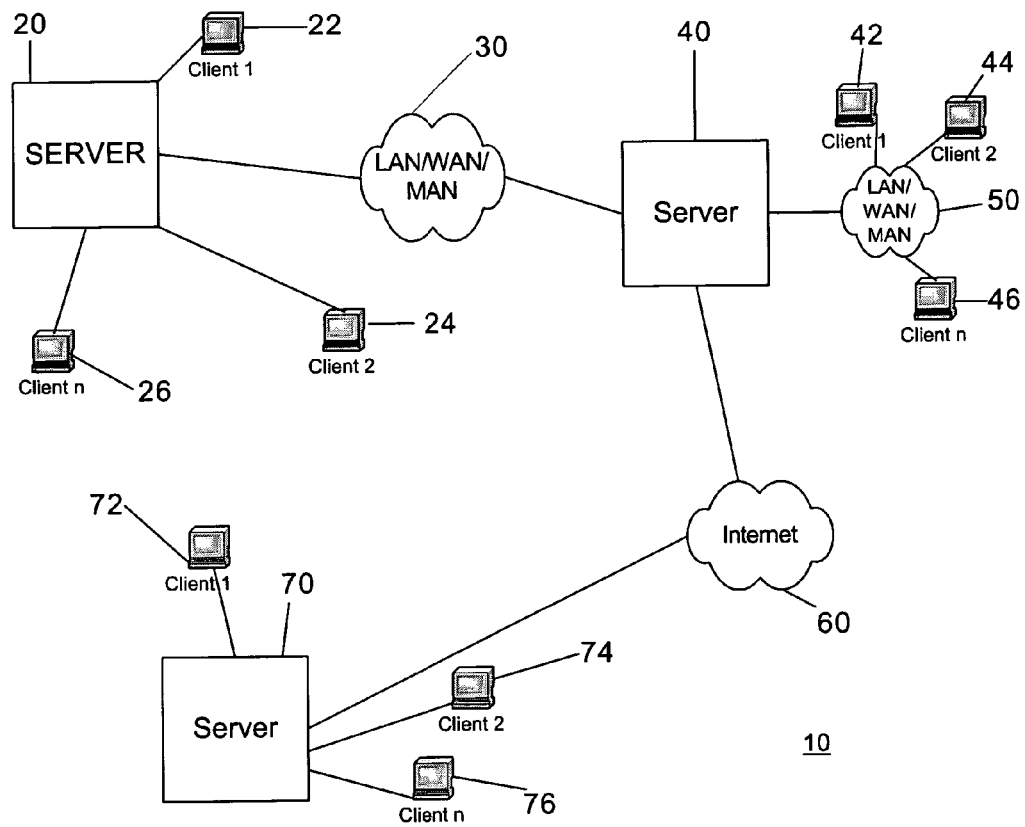
FIG. 1 is a block diagram illustrating a computer network in accordance with embodiments of the present invention.

Referring initially to FIG. 1, a block diagram of a computer network architecture is illustrated and designated using a reference numeral 10. A server 20 may be connected to a plurality of client computers 22, 24 and 26. The server 20 may be connected to as many as "n" different client computers. Each client computer in the network 10 may be a functional client computer and may be a desktop personal computer ("PC"), a notebook PC, a tablet PC, a personal digital assistant ("PDA"), for example. The magnitude of "n" may be a function of the computing power of the server 20.

The server 20 may be connected via a network infrastructure 30, which may include any combination of hubs, switches, routers, etc. While the network infrastructure 30 is illustrated as being either a local area network ("LAN"), storage area network ("SAN"), a wide area network ("WAN"), or a metropolitan area network ("MAN"), those skilled in the art will appreciate that the network infrastructure 30 may assume other forms or may even provide network connectivity through the Internet. As described below, the network 10 may include other servers as well, which may be dispersed geographically with respect to each other to support client computers in other locations.

The network infrastructure 30 may connect the server 20 to the server 40, which may be representative of any other server in the network environment. The server 40 may be connected to one or more client computers 42, 44, and 46. As illustrated in FIG. 1, a network infrastructure 50, which may include a LAN, a WAN, a MAN, or other network configuration, may be used to connect the client computers 42, 44 and 46 to the server 40. The server 40 may additionally be connected to the Internet 60, which may be connected to a server 70. The server 70 also may be connected to one or more of client computers 72, 74 and 76.

In the computer network 10, a wide array of problems may occur. For example, a virus or malicious code may attack the server 40, which may result in other systems, such as the plurality of client computers 42, 44, and 46, being impacted. Also, the server 40 may have to respond to various requests and code that may diminish performance. If the server 40 supports a large number of clients, such as a plurality of client computers 42, 44, and 46, a large customer or client base may experiences problems, which may result in delays in operation. In addition, if the server 40 is attacked by an unknown or unclassified virus, then the virus may damage information within the server 40 or result in downtime for the computer network 10.

Figure 2:
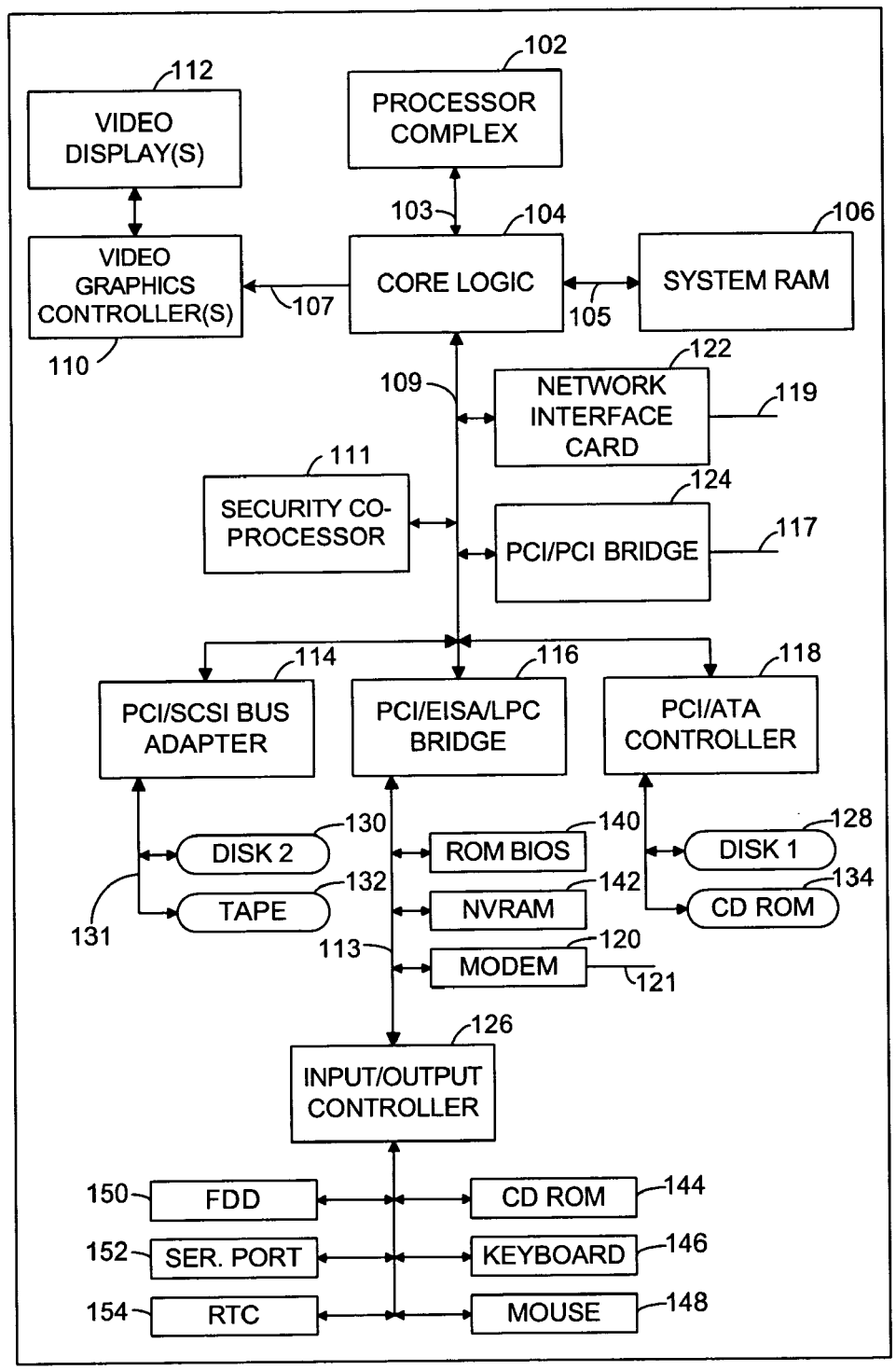
FIG. 2 is a block diagram illustrating a computer system in a network in accordance with embodiments of the present invention.

FIG. 2 is a block diagram illustrating an exemplary computer system in accordance with embodiments of the present invention. The computer system, which may include client computers 22, 24, 26, 42, 44, 46, 72, 74, 76 or servers 20, 40, 70, as discussed above, is generally referred to by the reference numeral 100. The architecture of the computer system 100 is given for purposes of illustration only, as computer systems in which the present teachings are applicable may include additional components or a subset of the components illustrated in FIG. 2.

The computer system 100 may comprise a processor complex 102, which may include a plurality of central processing units ("CPUs"). A core logic chipset 104, which may manage a variety of functions on behalf of the processor complex 102, may be connected to the processor complex via a processor bus 103.

The core logic chipset 104 may be connected via memory bus 105 to a system random access memory, which may comprise static random access memory ("SRAM"), dynamic random access memory ("DRAM") or other suitable memories. The memory may be a shared system memory to hold memory resident files. A video graphics controller 110 may be connected to the core logic chipset 104 via a video bus 107 to provide a signal that produces a display image on a video display 112.

A bus 109 such as a peripheral component interface ("PCI") bus or the like may connect the core logic chipset to a variety of system devices, such as a network interface card 122 and a PCI/PCI bridge 124. The network interface card 122 may provide communication capability to the computer system 100 via a communication bus 119. The communication bus 119 may be connected to other computer systems, as discussed above. The PCI/PCI bridge 124 may provide capacity for additional PCI devices on a PCI bus 117.

A PCI/SCSI bus adapter 114 may provide access to SCSI devices such as a disk drive 130 and a tape drive 132 via a SCSI bus 131. A PCI/ATA controller 118 may provide access to additional devices such as a disk drive 128 and a CD ROM drive 134. A PCI/EISA/LPC bus may provide access to system devices such as a read only memory basic input/output system ("ROM BIOS") 140, a non-volatile memory 142 (such as flash memory or the like), a modem 120 or the like via a bus 113. The modem may provide communication access via a phone line 121. An input/output controller 126, which may be connected to the bus 113 may provide access to system devices such as a floppy disk drive 150, a serial port 152 a real time clock ("RTC") 154, a CD ROM drive 144, a keyboard 146, a mouse 148 and the like.

A security co-processor 111 may be connected to the bus 109 to perform security functions as more fully described below. The security co-processor 111 may be configured to validate certain functions and activities before they are actually executed. Also, the security co-processor 111 may be dedicated to providing security functions to the computer system 100. Because the security co-processor 111 performs the security functions and activities, it frees the use of the CPU cycles on the processor complex 102 for other computing activities.

The security co-processor 111 may examine code independent of the operating system ("OS") executing in the computer system 100 or other computers in the computer network 10. For example, the security co-processor 111 may enable the computer system 100 to prevent thread technologies and unknown code from attacking the computer system 100. As a benefit to the computer system 100, the security co-processor 111 may examine code independently of the processor complex 102, which may be executing an operating system. As such, the security co-processor 111 may trap code that is unknown or unclassified to prevent it from impacting the performance or integrity of the computer system 100. Beneficially, the security co-processor 111 does not have to access stored information of known viruses or attack signatures to be able to prevent malicious code.

To communicate with the processor complex 102 or other components within the computer system 100, the security co-processor 111 may include indications regarding the file or code being accessed. For instance, the security co-processor 111 may include a return status field, such as a semaphore, which may be a flag to indicate whether the file or resource is being used by another thread or process. The return status field may be within a memory or a register, to name a few examples. The return status field may be used by the security co-processor 111 to communicate status information about the files that it validates.

Figure 3:
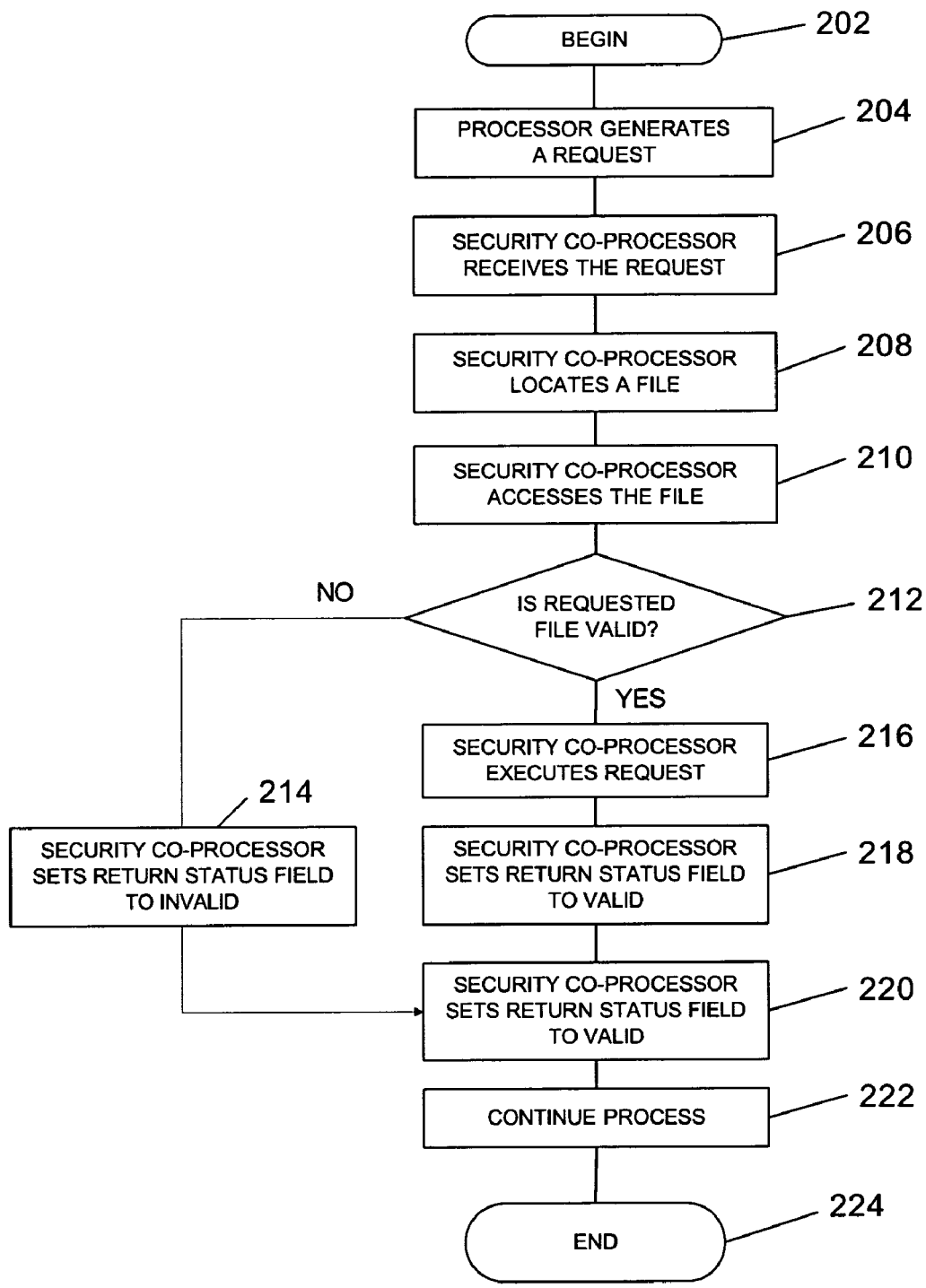
FIG. 3 is a process flow diagram illustrating a security process in accordance with embodiments of the present invention.

As noted above, it may be beneficial to protect the computer system 100 from unauthorized access by external systems, users, or programs. For instance, providing desired security may include protecting a system from viruses or attacks by hackers by implementing a security co-processor 111. One way to enhance security in the computer system 100 along with the security co-processor 111 may be to prevent or restrict access to system passwords without authentication that the access is by an authorized user. FIG. 3 shows an example of how the security co-processor 111 may operate to prevent unauthorized access to files stored on the computer system 100.

FIG. 3 is a process flow diagram illustrating a security process in accordance with embodiments of the present invention. In the process flow diagram 200, which may be best understood by concurrently viewing FIG. 2, a system, such as the computer system 100 of FIG. 2, may include a processor and a security co-processor. The processor may correspond to the processor complex 102 of FIG. 2 or another computer, and the security co-processor may correspond to the security co-processor 111 of FIG. 2. The process begins at block 202. The process involves the validation of a file in response to a command or request from a processor that may be an internal processor 102 to the computer system 100 or an external processor at a remote system. The security co-processor 111 may validate the request prior to the execution of certain commands on the system, while operating independently of the OS on the system. At block 204, the processor 102 may generate a request, which may be a request for a file. The request may include the filename, path, error correction information, identifying data, user identification, system identification, a password or other suitable information. In addition, the information or portions of the information within the request may be hashed or signed with a key. The processor 102 may transmit the request to a component, such as an I/O driver, which may be a part of the core logic chipset 104 or be a software program, which forwards the request to the security co-processor 111 in block 206.

At block 208, the security co-processor 111 may locate the file that corresponds to the request. The file may be located within the system memory 106 or 146. Then, at block 210, the security co-processor 111 may access or look up the file. In accessing the file, the security co-processor may access a record that corresponds to the requested file. The record may be a signed or hashed version of information that corresponds to users or systems authorized to access the file. The record may include similar information to the request, such as a filename, path, error correction information, identifying data, user identification, system identification, a password or other suitable information. Also, the record may be stored within a memory 106 or 146, a device, a local database, or a remote database that is accessible by the security co-processor 111. If the record is stored in a database, the security co-processor 111 may communicate with the database through a protocol, such as Lightweight Directory Access Protocol ("LDAP"). LDAP is a directory service protocol that may operate over TCP/IP. The record may include a signature or hash for verifying the authenticity or integrity of the requested file, such as a digital signature. This may allow the system 100 to determine if the file has been altered by signing a portion of the file, a compressed version of the file, or the complete file. Similarly, the system 100 may preload the file, as a memory resident file, into a cache or other similar memory location, such as system memory 106 or 146.

Digital "signatures" may be used to provide authentication of the file. A digital signature is a data component, such as a hash, that may have been encrypted using a private key authentication process or the like. The encryption process creates a unique signature, which may allow verification of a data file. The use of digital signatures may allow the security co-processor 111 to validate that the file requested is from a trusted source and/or that the file has not been subsequently altered by anyone else.

Additionally, the record associated with the request may include validation data such as an error checking and correction ("ECC") code. The ECC code may be implemented to repair potential problems with the file. For instance, if a file is corrupted or other problems exist with the file, the ECC code may be used to correct the file back to its original form. This may allow the system 100 to operate more efficiently because files may be corrected without involving the processor 102 or other failure routines.

At block 212, the security co-processor 111 may determine if the requested file is valid. The requested file may be verified to determine if the requested file is valid to perform certain commands or operations or if the requested file has been altered. The verification of the requested file may involve accessing information within the request, from a database, and/or memory location and comparing it with the file, a portion of the file, or the record, which may include information as discussed above. For example, the validation of the requested file may involve verifying a digital signature in the request against data within the record to authenticate or verify the integrity of the file. Further, the validation may involve verifying the ECC code of the file against data within the record. As another example, the request may be transmitted over LDAP, which may include information that verifies the authorization to access the files.

If the requested file is not valid, then a return status field may be set in block 214 to indicate that the file return is invalid. The setting may create a status message that indicates that the request is invalid, set a return status field to invalid, or simply abort the access. Advantageously, this allows the security co-processor to trap a file that fails authenticity or integrity verification checks against the record, validated version, or signed file. This may prevent new system or code attacks without pre-classification. However, if the requested file is valid, then the request may be executed at block 216. The execution of the request may involve delivering the file to the security co-processor 111, executing the command in the request, or other similar function. After the file is delivered to the security co-processor 111, a status return field may be set in block 218 to indicate that the file return is valid. The status return field setting may create a status message that indicates that the request is valid, set a return status to "return file good," or simply indicate that the file is access is complete.

After the return status field is set for the request, the security co-processor 111 may set the return status to "good" for the security validation for the request at block 220. The setting of the return status to "good" may result in a message being sent to the processor or may allow the security co-processor 111 to free up resources for other requests or may involve sending the file to the processor 102 for processing. Once the return status field is set for the request, the process may continue to process the file without the involvement of the security co-processor 111 at block 222. Thus, the process ends at block 224.

To provide additional security to the computer system 100, the requests to the security co-processor 111 may include the identity of a requestor. By including the identity of the requestor in the request, the security co-processor 111 may be able to provide added protection for certain files or prevent unauthorized access to certain information. A process flow illustrating a security process that verifies the identity of a requestor in accordance with embodiments of the present invention is shown in FIG. 4.

Figure 4:
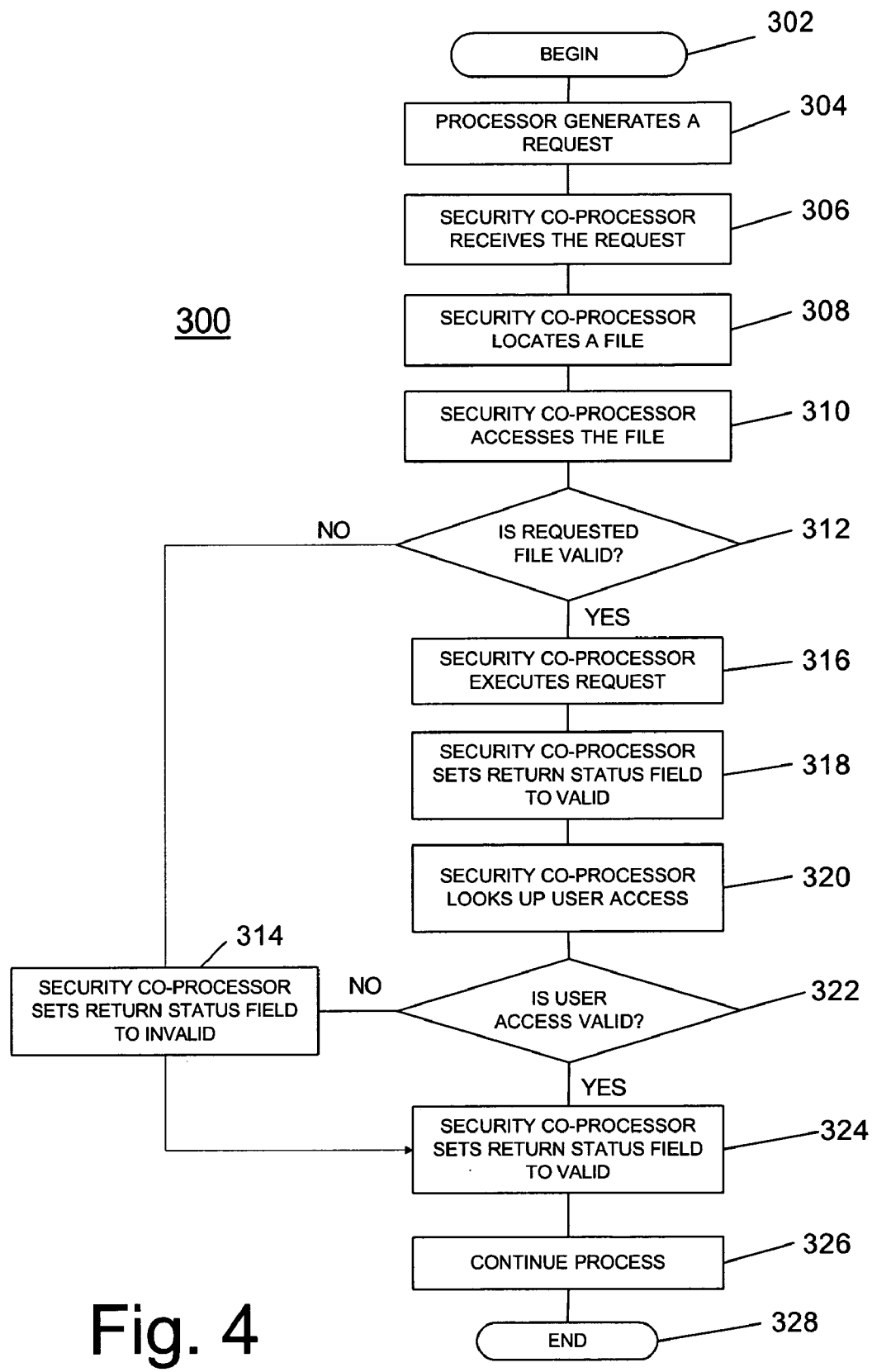
FIG. 4 is a process flow diagram illustrating a security process that verifies the identity of a requestor in accordance with embodiments of the present invention.

FIG. 4 is a process flow diagram, which may be best understood by concurrently viewing FIG. 2, illustrating the use of a security co-processor 111 to process requests and to verify the identity of a requester in accordance with embodiments of the present invention. In this process flow diagram 300, a system, such as the computer system 100 of FIG. 2, may include a processor 102 and a security co-processor 111. The process begins at block 302. In addition to the validation of requested file, the process may involve the validation of the user accessing the file. The security co-processor 111 may validate the requestor prior to the operation or execution of certain commands by the system. At block 304, the processor 102 may generate a request, which may be a request for a file or command. The processor 102 may transmit the request to a component, such as an I/O driver, that forwards the request to the security co-processor 111 in block 306, similar to step 206 of FIG. 3 discussed above.

At block 308, the security co-processor 111 may locate the file that corresponds with the request. Then, at block 310, the security co-processor 111 may access the file. The access of the file may be similar to the file lookup in block 210 of FIG. 3, which may include a record having a digital signature to verify authenticity or the integrity of the file. As previously discussed, the record may be stored within a variety of locations, such as a memory 106 or 146 that is coupled to the security co-processor 111, and may communicate with the database through a protocol, such as LDAP.

At block 312, the security co-processor 111 may determine if the requested file is valid. The requested file may be verified as discussed above with regard to block 212 of FIG. 3. If the requested file is not valid, then a return status field may be set in block 314 to indicate that the file return is invalid. The setting of the return status field may create a status message that indicates that the request is invalid, set a return status field to invalid, or simply abort the access. Again, this allows the security co-processor 111 to trap a file that fails to be verified, as discussed above. However, if the requested file is valid, then the request may be executed at block 316. The execution of the request may involve delivering the file to the security co-processor 111, executing the command in the request, or other similar function. After the file is transmitted to the security co-processor 111, a status return field may be set in block 318 to indicate that the file return is valid. The status return field setting may create a status message that indicates that the request is valid, set a return status to "return file good," or simply indicate that the file is access is complete.

At block 320, the security co-processor 111 may validate whether the user who requested access to the file or command is an authorized user. In validating the user access, the security co-processor 111 may access a record that corresponds to the user access being requested. The record may include a signature for verifying the authenticity of the user requesting the file or the execution of a command. Similar to the file discussed above, the authenticity of the user access may be provided by a digital signature. The digital signature may be created through any manner, such as a private and public key or hash algorithm, for example. The user access may include commands, authorized files or other information relating to the user. At block 322, the security co-processor 111 may determine if the user access is valid. The verification of the user access may be through accessing information within the security co-processor 111, from a database, or memory location. The information may then be matched against the user access information to determine if the user access is valid.

If the user access is valid, then the return status field may be set to "valid" at block 322. However, if the user access is not valid, then a return status field may be set in block 314 to indicate that the return status is invalid. As discussed before, the return status field being set to "invalid" may result in a message being generated or the processor 102 being notified of the failed request. After the return status field is set for the user access, the security co-processor 111 may set the return status field to "good" for the security validation at block 324. The setting of the return status field to "good" may result in a message being sent to the processor 102, may allow the security co-processor 111 to free up resources for other requests, or may involve sending the file to the processor 102 for processing. Once the return status field is set for the request, the process may continue to process the file without the involvement of the security co-processor 111 at block 326. The process ends at block 328.

In an alternative embodiment, the lookup of the user access of block 320 may be implemented after the security co-processor 111 looks up the file in block 310. Then, the user access verification of block 322 may be performed. After the user access has been verified, the validation of requested file may take place at block 312. Accordingly, the verification process may be further variety for other designs.

To further enhance the security, the requests to the security co-processor 111 may include a number or value to identify a requestor. The identifying value may be a nonce, which is a randomly generated number, or may be a time stamp that is associated with the time of the request. By including the identifying value, the security co-processor 111 may be able to provide added protection for certain files or prevent unauthorized access to certain information. In addition, the identifying value may be exchanged before the request is received by the security co-processor 111, delivered after the request has been sent, or as part of the requesting process. As a result, the security co-processor may prevent playback attacks or other similar attacks from being able to access the computer system. Using the identifying value may provide the computer system 100 with increased security without burdening the processor 102. A process flow illustrating a security process that verifies the number or value identifying a requestor in accordance with embodiments of the present invention is shown in FIG. 5.

Figure 5:
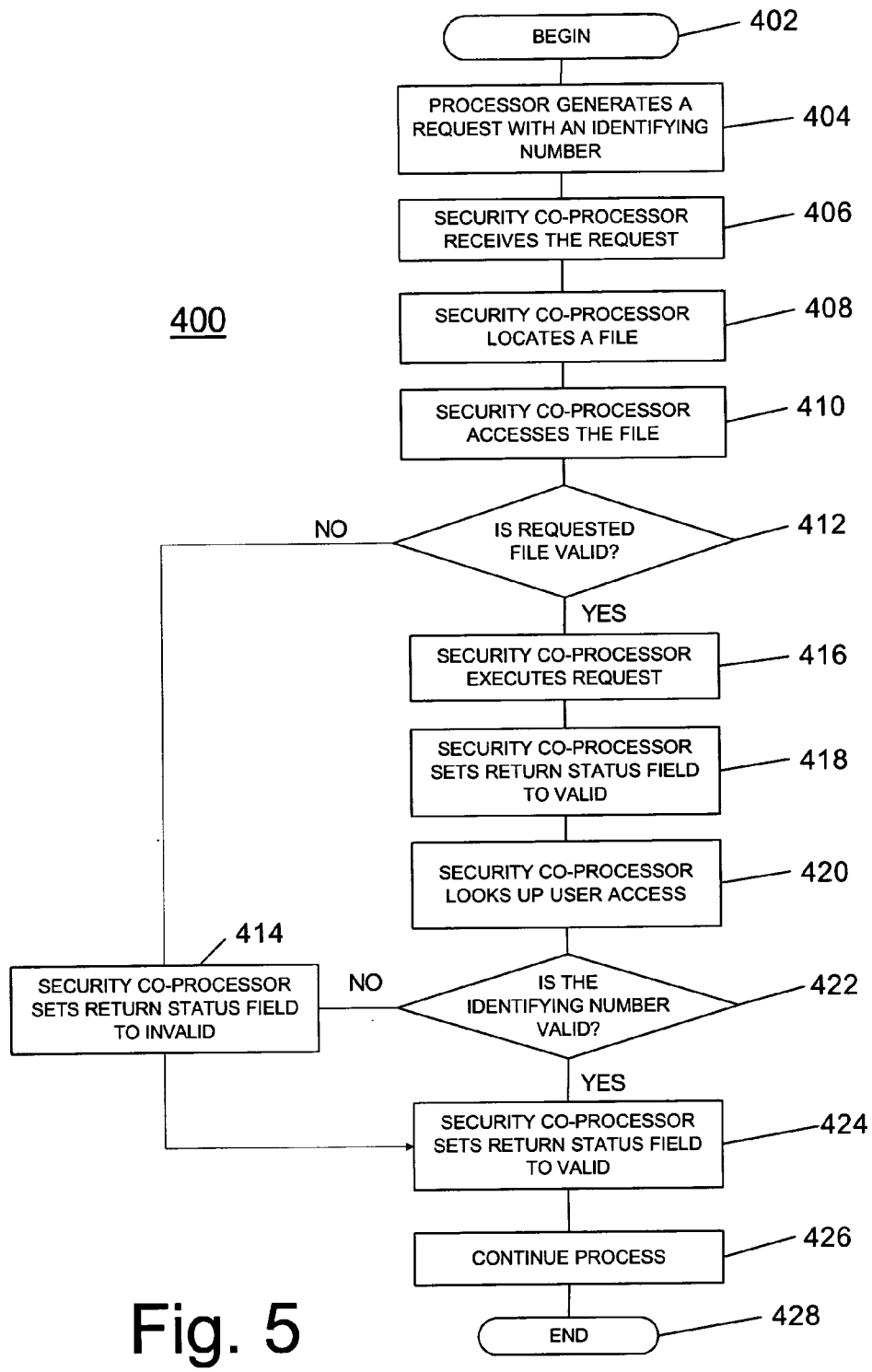
FIG. 5 is a process flow diagram illustrating a security process that verifies an identifying number associated with a request in accordance with embodiments of the present invention.

FIG. 5 is a process flow diagram, which may be best understood by concurrently viewing FIG. 2, illustrating the use of a security co-processor 111 to process requests and verify a nonce, which may be a random number to identify a requester, in accordance with embodiments of the present invention. In this process flow diagram 400, a system, such as the computer system 100 of FIG. 2, may include a processor 102 and a security co-processor 111. The process begins at block 402. In addition to the validation of a command or request in FIG. 3, the process involves the use of an identifying number to validate the requestor of the command or file. The security co-processor 111 may validate the requester prior to the operation of certain commands on the system. At block 404, the processor 102 may generate a request along with an identifying value, which may be a request for a file or command. The request may include a variety of information, such as a filename, path, user identification, or system identification, as discussed above. In addition, the request may also include hashed or signed information that may be associated with a time stamp, a random number, or nonce as well. The identifying value or number may be a nonce or time stamp, as discussed above, which may be exchanged before the request is received by the security co-processor 111. The processor 102 may transmit the request along with the identifying number to a component, such as an I/O driver, that forwards the request to the security co-processor 111 in block 406, which is similar to step 206 of FIG. 3 discussed above.

At block 408, the security co-processor 111 may locate the file that corresponds with the request. Then, at block 410, the security co-processor 111 may access the file. The access of the file may be similar to the file lookup in block 210 of FIG. 3, which may include a record having a digital signature for authenticity, integrity, or error correction code ("ECC"). The record may also include hashed or signed information that may be associated with a time stamp, a random number, or nonce. As previously discussed in FIG. 3, the record may be stored within a memory that is coupled to the security co-processor 111 and may communicate with the database through a protocol, such as LDAP.

At block 412, the security co-processor 111 may determine if the requested file is valid. The requested file may be verified as discussed above with regard to block 212 of FIG. 3. If the requested file is not valid, then a return status field may be set in block 414 to indicate that the file return is invalid, as discussed above with regard to block 214 of FIG. 3. As noted above, the security co-processor 111 may trap a file that fails to be verified without pre-classification. However, if the requested file is valid, then the request may be executed at block 416, as discussed above with regard to block 216 of FIG. 3. After the file is transmitted to the security co-processor 111, a status return field may be set in block 418 to indicate that the file return is valid.

At block 420, the security co-processor 111 may look up the identifying number. In looking up the identifying number, the security co-processor 111 may access a record that corresponds to the identifying number within the request. The record may include an identifying number, such as a randomly generated number for the communication that may be used to provide additional security. This protection may prevent playback attacks from circumventing security of the computer system 100. The authenticity of the identifying number may be hashed or signed to provide additional protection as discussed above with regard to the file or request. At block 422, the security co-processor 111 may determine if the identifying number is valid. The verification of the identifying number may be through accessing information within the security co-processor 111, from a database, or memory location. The information may then be matched against the identifying number to determine if the user is authorized or the command is valid.

If the identifying number is valid, then the return status field may be set to "valid" at block 422. However, if the identifying number is not valid, then a return status field may be set in block 414 to indicate that the return status is invalid. As discussed before, the return status field being set to "invalid" may result in a message being generated or the processor 102 being notified of the failed request. After the return status field is set for the user access, the security co-processor 111 may set the return status field to "good" for the security validation at block 424. The setting of the return status field to "good" may result in a message being sent to the processor 102, may allow the security co-processor 111 to free up resources for other requests, or may involve sending the file to the processor 102 for processing. Once the return status field is set for the request, the process may continue to process the file without the involvement of the security co-processor 111 at block 426. The process ends at block 428.

Alternatively, the lookup of the identifying number, such as the nonce or time stamp, in block 420 may be implemented after the security co-processor 111 looks up the file in block 410. Then, the identifying number verification of block 422 may be performed. After the identifying number has been verified, the validity of the requested file may be determined at block 412. As another alternative embodiment, the verification of user access 320 and 322 of FIG. 4 may be implemented in the process flow diagram 400 of FIG. 5 after block 410 and before block 426. Accordingly, the verification process may be further variety for other designs.

While the invention may be applicable to various modifications and alternative forms specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of providing security for a computer system, the method comprising the acts of:
generating a request for a file;
receiving the request at a dedicated security processor;
using the dedicated security processor to access the file;
using the dedicated security processor to validate the requested file;
providing the file to an other processor, if the requested file is validated;
validating a user access to execute the request; and
enabling the other processor to continue processing the file, if the user access is validated.

2. The method, as set forth in claim 1, comprising the act of responding to the other processor with an abort message if the user access is invalid.

3. The method, as set forth in claim 1, wherein accessing the file comprises loading the file from a system memory.

4. The method, as set forth in claim 1, wherein accessing the file comprises loading a memory resident file.

5. The method, as set forth in claim 1, wherein the dedicated security processor is in a remote computer system.

6. The method, as set forth in claim 1, wherein the other processor and the dedicated security processor are disposed in a computer system.

7. The method, as set forth in claim 1, comprising the act of setting a return status field to valid, if the requested file is valid.

8. The method, as set forth in claim 1, wherein the act of generating the request comprises the acts of:
setting a semaphore;
forwarding the semaphore to the dedicated security processor; and
blocking further processing of the file, if the semaphore is not set to a specific setting.

9. A method of providing security for a computer system, the method comprising the acts of:
generating an identifying number from a security processor;
providing the identifying number to an other processor in the computer system;
incorporating the identifying number into a request for a file;
delivering the request to the security processor;
using the security processor to access the file;
using the security processor to validate the requested file;
verifying the identifying number at the security processor; and
providing the file, if the requested file is validated and the identifying number is verified.

10. The method, as set forth in claim 9, comprising the act of enabling the other processor to continue the processing, if the identifying number is validated.

11. The method, as set forth in claim 9, comprising the act of terminating the access if the identifying number is invalid.

12. The method, as set forth in claim 9, wherein the security processor is in a remote computer system.

13. The method, as set forth in claim 9, wherein the other processor and the security processor are disposed in the computer system.

14. The method, as set forth in claim 9, wherein the identifying number is a nonce.

15. The method, as set forth in claim 9, wherein the identifying number is a time stamp.

16. The method, as set forth in claim 9, wherein the act of validating the requested file comprises the act of accessing a database for an error checking and correction ("ECC") code corresponding to the requested file.

17. A computer system comprising:
  means for validating a file at a security processor, wherein the means for validating the file comprises:
    means for storing a record in a memory used to validate the file;
    means for verifying the record against the file at the security processor; and
    means for indicating that the file is verified to an other processor.

18. The system, as set forth in claim 17, comprises means for validating a user access.

19. The system, as set forth in claim 17, wherein the means for verifying comprises:
  means for storing a public key and a hash algorithm used to validate the file;
  means for storing an encrypted hash correlative to the requested file in the record; and
  means for comparing the record with the requested file.

20. The system, as set forth in claim 17, comprises means for verifying an identifying number in a request at the security processor.

21. A networked computer system comprising:
  a plurality of computer systems;
  a network coupled to each of the plurality of computer systems;
  at least one of the plurality of computer systems comprising:
    a first processor;
    a security processor operatively coupled to the first processor;
    a first section of memory configured to store a file, the first section of memory being operatively coupled to the first processor and the security processor; and
    a second section of memory being configured to store a validation program that is initiated by the security processor, the validation program having a validation routine configured to validate the file stored in the first section of memory when the security processor receives a request for the file, and the validation program using an encrypted code to validate the file.

22. The system, as set forth in claim 21, wherein a second processor in a second of the plurality of computer systems is adapted to utilize the security processor for validating the file.

23. The system, as set forth in claim 22, wherein the memory is a memory resident file.

24. The system, as set forth in claim 21, wherein the request comprises a semaphore and an address for the semaphore, wherein the semaphore blocks the processor from executing the file, if the semaphore is set in a specified manner.

25. The system, as set forth in claim 21, wherein a second processor in a second of the plurality of computer systems is adapted to generate a request for the file from the security processor and is adapted to receive the validated file from the security processor.

26. A method of providing security for a computer system, the method comprising the acts of:
  generating a request for a file;
  receiving the request at a dedicated security processor;
  using the dedicated security processor to access the file;
  using the dedicated security processor to validate the requested file;
  providing the file to an other processor, if the requested file is validated; and
  disabling the other processor once the file is requested and enabling the other processor to continue processing after the requested file is validated.

27. A method of providing security for a computer system, the method comprising the acts of:
  generating a request for a file;
  receiving the request at a dedicated security processor;
  using the dedicated security processor to access the file;
  using the dedicated security processor to validate the requested file, wherein the act of validating the requested file comprises the act of accessing a database for a digital signature of the file being requested; and
  providing the file to an other processor, if the requested file is validated.

28. The method, as set forth in claim 27, wherein the act of validating the requested file comprises the act of calculating a secure hash and comparing the calculated secure hash to a stored secure hash.

29. A method of providing security for a computer system, the method comprising the acts of:
  generating a request for a file;
  receiving the request at a dedicated security processor;
  using the dedicated security processor to access the file;
  using the dedicated security processor to validate the requested file, wherein the act of validating the requested file comprises the act of accessing a database for an error checking and correction ("ECC") code corresponding to the requested file; and
  providing the file to an other processor, if the requested file is validated.

30. The method, as set forth in claim 29, wherein the act of accessing the database comprises the act of correcting the file by utilizing the ECC code corresponding to the requested file.

* * * * *